United States Patent
Tanaka et al.

[11] Patent Number: 5,978,340
[45] Date of Patent: Nov. 2, 1999

[54] COMPACT SWITCHING MEANS FOR DRIVING A RECORDING MEDIUM

[75] Inventors: Masanobu Tanaka; Tatsumaro Yamashita, both of Miyagi-ken, Japan

[73] Assignee: Alps Electric Co., Ltd., Tokyo, Japan

[21] Appl. No.: 08/936,298

[22] Filed: Sep. 25, 1997

[30] Foreign Application Priority Data

Sep. 27, 1996 [JP] Japan ................................ 8-255714

[51] Int. Cl.⁶ ............................................... G11B 19/02
[52] U.S. Cl. ...................................... 369/75.2; 369/77.2
[58] Field of Search ................. 369/75.2, 77.2; 360/105

[56] References Cited

U.S. PATENT DOCUMENTS

| | | | |
|---|---|---|---|
| 5,329,504 | 7/1994 | Mukawa | 369/13 |
| 5,450,377 | 9/1995 | Eom | 369/13 |
| 5,485,329 | 1/1996 | Lee | 360/99.06 |
| 5,500,838 | 3/1996 | Matsumoto et al. | 369/13 |
| 5,537,376 | 7/1996 | Ikuma | 369/77.2 |
| 5,572,497 | 11/1996 | Kim et al. | 369/772 |
| 5,673,244 | 9/1997 | Choi | 360/99.07 |

FOREIGN PATENT DOCUMENTS

| | | |
|---|---|---|
| 0 644 539 A2 | 9/1994 | European Pat. Off. . |
| 44 22 997 A1 | 6/1994 | Germany . |
| 196 45 149 A1 | 10/1996 | Germany . |
| 3-283047 | 12/1991 | Japan . |
| 5-325375 | 12/1993 | Japan . |

*Primary Examiner*—David D. Davis
*Attorney, Agent, or Firm*—Brinks Hofer Gilson & Lione

[57] ABSTRACT

A recording medium driving apparatus employing a compact and high-functionality switching mechanism for loading and unloading a recording medium. The switching mechanism includes a first switching lever movable in a predetermined direction, and a second switching lever whose direction of movement is reversed by an inverting link after moving with the first switching lever in the predetermined direction, the first switching lever includes an arm driving portion for a cartridge and a holder control section for a cartridge holder, and the second switching lever includes a magnetic head control portion. The direction of motion of the second switching lever is reversed when the first switching lever moves so that driving and controlling are shared between both levers.

8 Claims, 12 Drawing Sheets

5,978,340

COMPACT SWITCHING MEANS FOR DRIVING A RECORDING MEDIUM

BACKGROUND OF THE INVENTION

1. Field of the Invention

The present invention relates to a recording medium driving apparatus in which a recording medium of a cartridge (hard case) having a disc therein is pulled to a position where the recording medium is ready to be driven and the recording medium is ejected after use and, more particularly, to a recording medium driving apparatus in which switching means for pulling and ejecting the recording medium is compact and features a high functionality.

2. Description of the Related Art

FIG. 15 is a perspective view of a Mini Disc M as one example of the recording medium.

In the Mini disc M, a magneto-optical recording disc is accommodated in a hard case cartridge C having a generally square shape in plan view. The cartridge C has on its underside an aperture exposing a disc center hole (clamp hole). A shutter S is slidably supported on the right-hand side edge portion of the cartridge C with respect to the direction of insertion of the cartridge C (direction of X1), and when the shutter S is slid in a direction of X2, a window formed in the cartridge is seen. In a reproduction only Mini Disc M, a window appears on only the underside of the cartridge C, and an optical head faces the disc inside through the window.

In a recordable Mini Disc M, windows appear on both top and bottom sides of the cartridge C when the shutter S is slid, exposing the disc inside through the top and bottom windows. During a recording operation, an optical head faces the bottom surface of the disc through the bottom window of the cartridge C and a magnetic head Mm contacts the top surface of the disc through the top window of the cartridge C.

In a driving apparatus (disc device) for driving the Mini Disc M, a holder into which the Mini Disc is inserted is arranged, and a pull member 81 is arranged on one side of the holder as shown in FIG. 15. A pulling pawl 82 is integrally formed with the pull member 81. When the cartridge C is inserted into the holder in the X1 direction, an insertion forward edge C2 of the cartridge C touches an inclined face 82a of the pulling pawl 82, pivoting the pull member 81 in a direction of (iii), and when the cartridge C is further inserted in the X1 direction, the pulling pawl 82 is received within and engaged with a locking notch C1 on one side of the cartridge C under the urging of a spring or the like. By the driving force of the pull member 81 in the X1 direction, the cartridge C in the holder is pulled in the X1 direction.

At the moment the cartridge C is fully pulled into the holder, the disc in the cartridge C is clamped onto a clamp table in a disc driving section.

In the disc device into which the cartridge C such as the Mini Disc M shown in FIG. 15 is inserted, the shutter S is opened before the cartridge C is loaded onto the clamp table of the driving section, and thus the travel of the cartridge C in its insertion process is long. During a reproduction operation, a reproduction is started by driving the optical head at the moment the loading of the cartridge C is inserted and loaded by the pull member 81, while during a recording, a switching operation is still required to cause the magnetic head to touch the disc through the window of the cartridge C after the loading of the cartridge C is completed. Since the pulling operation of the cartridge and the touching operation of the magnetic head with the disc are conventionally performed by separate driving sources, the disc device requires two respective driving sources therewithin, thereby rendering itself complicated.

It is contemplated that a common motor is shared to perform a series of steps covering the pulling operation of the cartridge C by the pull member 81 and a subsequent position control operation of the magnetic head. With such a series of steps implemented, however, the magnetic head needs has to be controlled after the cartridge C is pulled in by the pull member 81, and thus, a switching lever cooperating with the insertion member 81 needs a drive section for the pull member 81, while a control section or a drive section for controlling the magnetic head is also required, and such an arrangement results in a long switching lever and a long overall stroke of travel of the switching lever. As a result, the long switching lever and its long stroke of travel needs an increased dimension of the apparatus, and the apparatus becomes bulky. Conversely, to perform the series of steps for the insertion of the cartridge C and control of the magnetic head in a compact apparatus, the travel of the insertion of the cartridge C should be shortened and narrowed, respectively. In such an arrangement, the cartridge C has to be inserted deep into the holder to such an extent that operational inconveniences result.

SUMMARY OF THE INVENTION

The present invention has been developed to resolve the above problem, and it is an object of the present invention to provide a recording medium driving apparatus which employs common switching means performing a series of steps covering an insertion operation of a recording medium and control of a head, wherein the length and operation area of the switching lever of the switching means are shortened to make the apparatus compact while a long stroke of pull is assured for the recording medium to facilitate a manual insertion of the recording medium.

The recording medium driving apparatus of the present invention comprises a holder (11) into which a recording medium (D) is inserted, a driving unit (Kd) which performs recording and reproduction with the recording medium (D) loaded therein, a head (Hm) facing the recording medium (D), and mode switching means (50) driven by a motor (M2). The mode switching means (50) comprises a first switching lever (54) which is moved in a predetermined direction by the motor (M2), an inverting member (59) for inverting the direction of a driving force applied to the first switching lever (54), and a second switching leyer (63). The second switching lever (63) which, after moving integrally in the same direction as the first switching lever (54), is moved in the direction opposite to the direction of movement of the first switching lever (54) by the inverting member (59). The loading of the recording medium (D) into the driving unit (Kd) is completed when the first switching lever (54) moves in the predetermined linear direction. The second switching lever comprises a head controller for moving the head (Hm) in relation to the recording medium (D), when the second switching lever moves in the direction opposite to the direction of the first switching lever (54).

The recording medium (D) is based on magneto-optical recording system, the head (Hm) is a magnetic head which faces one side of the recording medium (D) with an optical head Ho facing the other side of the recording medium (D) while moving integrally with the optical head (Ho), and the head controller (72) comprises a reproduction setting section (72b) for moving the head (Hm) to a position close to the recording medium in a reproduction mode and a recording mode setting section (72c) for setting a recording mode by moving the head (Hm) to a position of contact with the recording medium (D) while the second switching lever (63) moves in the opposite direction.

The first switching lever (54) comprises a standby section (73) which moves and holds the head (Hm) to a position spaced farther apart from the recording medium (D) than in the reproduction mode, the position of the head (Hm) is determined by the standby section (73) when the first switching lever (54) starts moving in the predetermined direction, and the position of the head (Hm) is controlled by the head controller (72) of the second switching lever (63) when the first switching lever (54) moves further in the predetermined direction.

The recording medium driving apparatus further comprises the holder (11) into which the recording medium (D) is inserted, and a pull/ejection mechanism (30) for pulling the recording medium (D) into the holder (11) and ejecting the recording medium (D) out of the holder (11), wherein the first switching lever (54) comprises a drive section (55) which causes the pull/ejection mechanism (30) to operate in the direction of pulling the recording medium (D) when the first switching lever (54) moves in the predetermined direction and which causes the pull/ejection mechanism (30) to operate in the direction of ejecting the recording medium (D) when the first switching lever (54) moves in the opposite direction.

The recording medium driving apparatus further comprises the holder (11) into which the recording medium (D) is inserted, and a pull/ejection mechanism (30) for pulling the recording medium (D) into the holder (11) and ejecting the recording medium (D) out of the holder (11), wherein the first switching lever (54) comprises a drive section (55) which causes the pull/ejection mechanism (30) to operate in the direction of pulling the recording medium (D) when the first switching lever (54) moves in the predetermined direction and which causes the pull/ejection mechanism (30) to operate in the direction of ejecting the recording medium (D) when the first switching lever (54) moves in the opposite direction, and a holder control section (57) which loads the recording medium (D) out of the holder (11) into the driving unit (Kd) by moving the holder (11) to the driving unit (Kd) when the first switching lever (54) have moved in the predetermined direction; the head (Hm) is kept to the position spaced farther away from the recording medium (D) than in the reproduction mode by the head controller (72) of the second switching lever (63) at the moment the recording medium (D) is loaded in the driving unit (Kd) by the holder control section (57); and the reproduction mode and recording mode are set by the movement of the second switching lever (63) in the opposite direction.

The recording medium driving apparatus further comprises a sensor member (SW3) for sensing a start point and an end point of the reciprocal movement of the second switching lever, wherein the start and end of the operation of the mode switching means (50) is sensed in the sensing operation of the sensor member (SW3).

The inverting member (59) amplifies a stroke of the second switching lever (63) in the opposite direction against a stroke of the first switching lever (54) in the predetermined direction.

The recording medium of the present invention is a cartridge C having a disc D, such as a Mini Disc M to be described later in connection with the embodiments of the present invention, and the cartridge accommodates not only the Mini Disc, but also DVD, PD and a magneto-optical disc.

According to the present invention, the mode switching means (50) is driven by the motor (M2), and in its series of steps, the mode switching means (50) completes the loading of the recording medium (D) hand performs the switching operations to the reproduction mode and further to the recording mode.

In a preferred embodiment of the present invention, the stroke of travel by the first switching lever (54) in the operation of the mode switching means (50) drives the pull/ejection mechanism (30) so that the recording medium (iii) is pulled and loaded to the driving unit (Kd). In an arrangement that the recording medium (D) is manually inserted, after the recording medium (D) is manually loaded into the driving unit (Kd), the travel of the first switching lever (54) in the predetermined direction locks the holder (11), or disables and locks an ink jet mechanism for ejecting the recording medium (D), and thus the loading of the recording medium is complete.

According to the present invention, the second switching lever (63) moves in the predetermined direction (X1) following the first switching lever (54), and the second switching lever (63) then changes direction and moves in a direction (X2) opposite to the predetermined direction, and a head controller (72) mounted on the second switching lever (63) moving in the opposite direction performs head position control. With this arrangement, the first switching lever and the second switching lever are positioned in a side-by-side fashion, the first switching lever (54) is made responsible for the holder control section (57) for controlling the positions of the drive section (55) for pulling the recording medium and the holder (11), the second switching lever (63) is made responsible for the head controller (72), and the drive section (55) or the holder control section (57) of the first switching lever and the head controller (72) of the second switching lever (63) are positioned closely or in a side-by-side fashion, the first switching lever (54) is shortened in the direction of movement, and the apparatus is generally made compact.

Since relative to its axis of rotation (58), the inverting member (59) has a distance of its point of connection (65) with the second switching lever (63) longer than a distance of its point of connection (61) with the first switching lever (54), a stroke of travel of the second switching lever (63) is amplified to be longer than a stroke of travel of the first switching lever (54). As a result, the stroke of travel of the first switching lever (54) is shortened, resulting in a compact design in the apparatus.

With the head controller (72) mounted on the second switching lever (63), the positions of the head Hm may be set to be two positions, a lifted position and a down position in contact with the recording medium (D), but the positions of the head Hm may be preferably set to be three positions of a standby position spaced farthest apart from the recording medium (D), a reproduction mode position nearer to the recording medium (D), and a recording mode position for contact with the recording medium (D). By setting up the three positions, the drop height of the head (Hm) during shifting from the reproduction mode to the recording mode is shortened, alleviating the impact exerted on the head (Hm).

The standby section (73) of the first switching lever (54) lifts the head (Hm), and when the first switching lever (54) has run by a predetermined distance in the predetermined direction (X1), the control of head lifting is transferred to a standby section (72a) of the head controller (72) of the second switching lever (63), the second switching lever (63) is moved in the opposite direction (X2), the reproduction setting section (72b) sets the reproduction mode, and the recording mode setting section (72c) sets the recording mode, thereby shortening the return stroke of the second switching lever (63) in the opposite direction (X2), and resulting in a generally compact design in the apparatus.

Since the second switching lever (63) reciprocates, a single sensor member (SW3) senses the start point and end point of the second switching lever (63), thereby sensing the start and end of the operation of the switching means (50). Namely, the use of a single sensor member (SW3) is sufficient, contributing to a simple construction of the apparatus.

DESCRIPTION OF THE PREFERRED EMBODIMENTS

Figure 1:
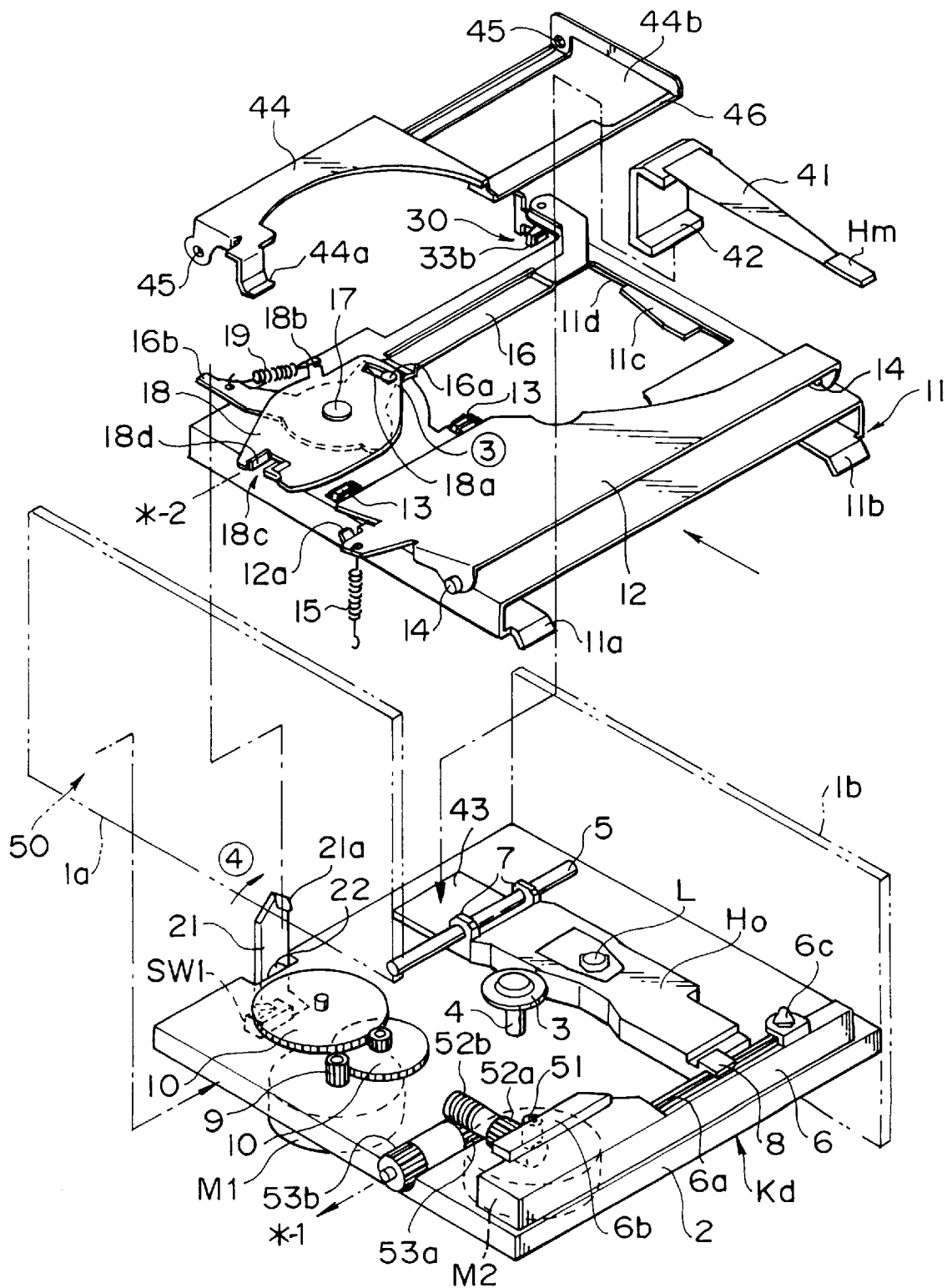
FIG. 1 is an exploded perspective view of the disc device for a Mini Disc as a recording medium driving apparatus of the present invention.

Referring now to the drawings, a disc device as one embodiment of the recording medium driving apparatus of the present invention is discussed.

Figure 2:
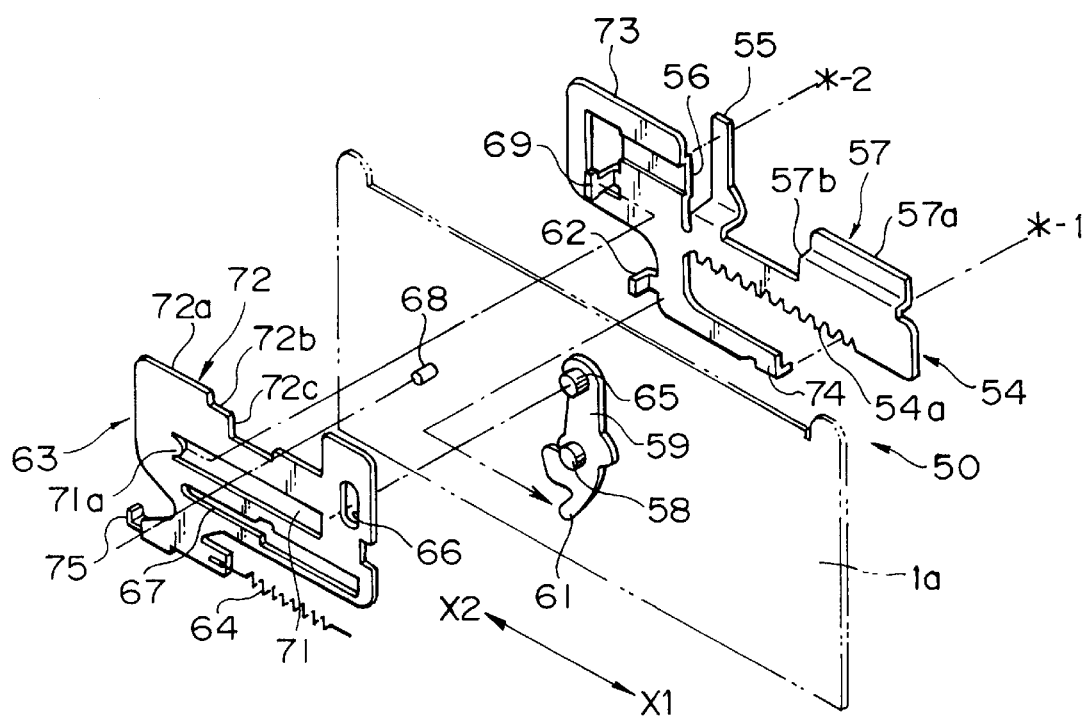
FIG. 2 is an exploded perspective view showing switching means of the disc device.
Figure 3:
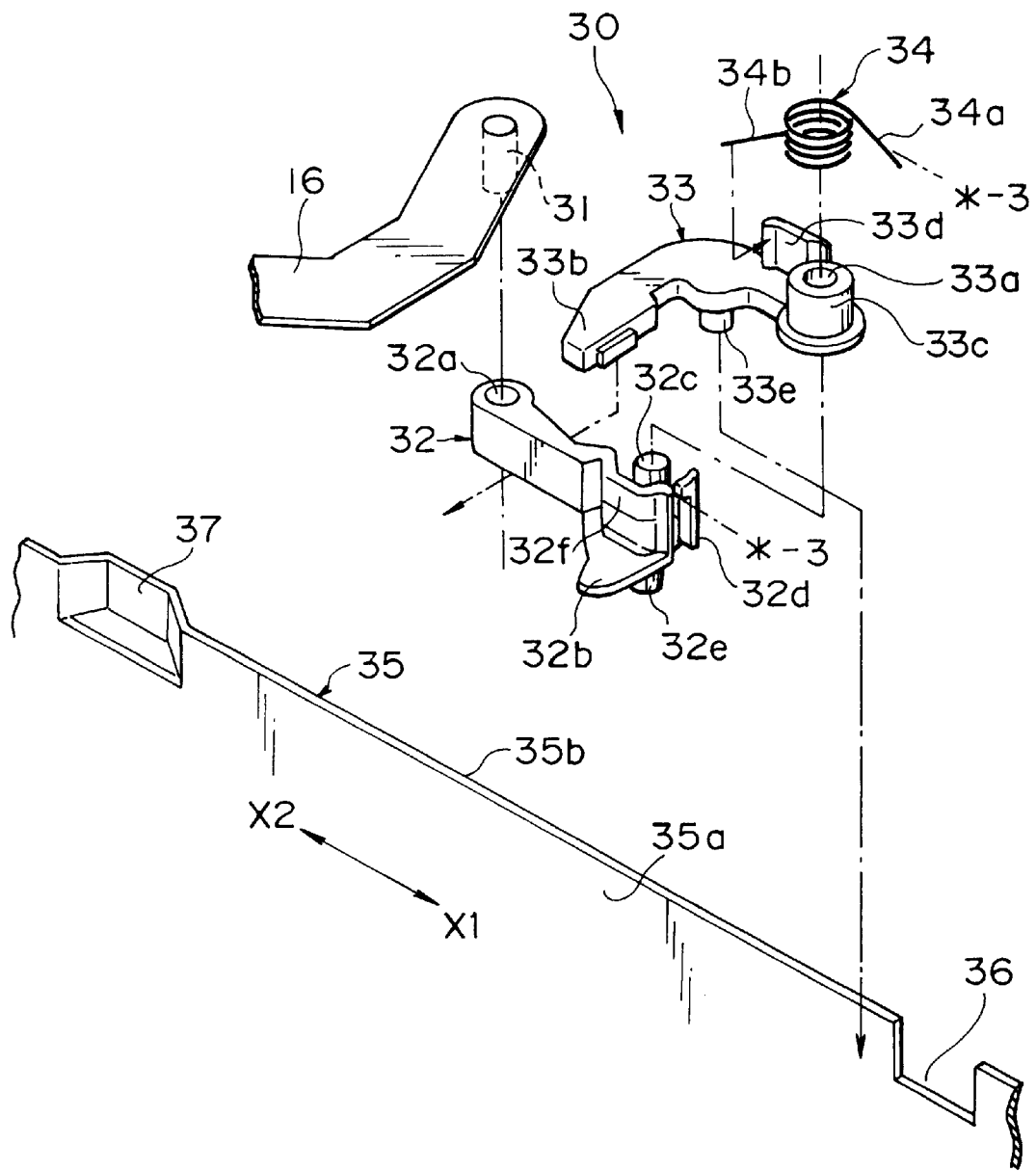
FIG. 3 is an exploded perspective view showing a pull/ejection mechanism of the disc device.

FIG. 1 is an exploded perspective view showing a major portion of the disc device, FIG. 2 is an exploded perspective view showing switching means, and FIG. 3 is an exploded perspective view showing a pull/ejection mechanism of the device.

Figure 4:
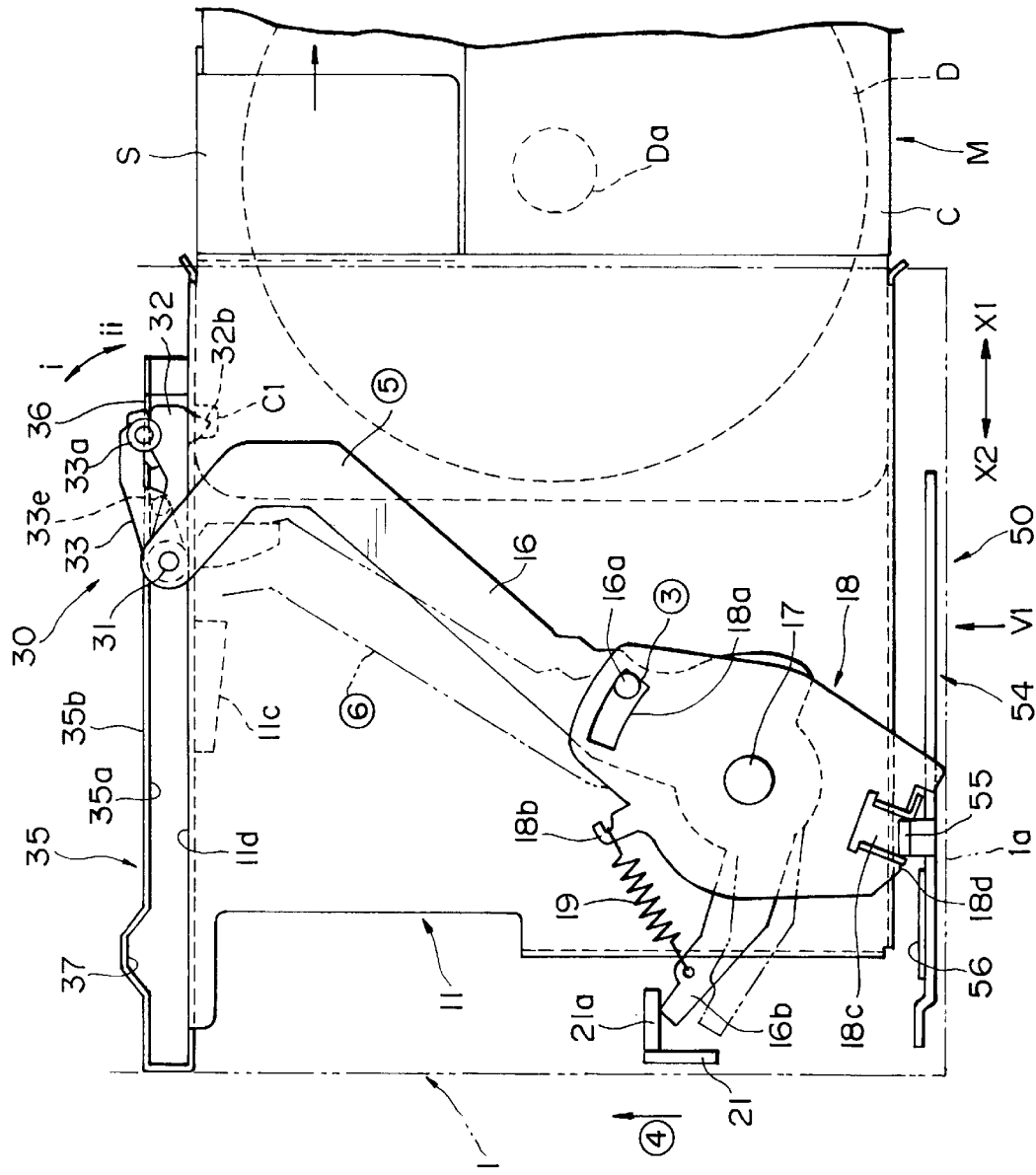
FIG. 4 is a plan view showing the disc device when a disc is being inserted.
Figure 5:
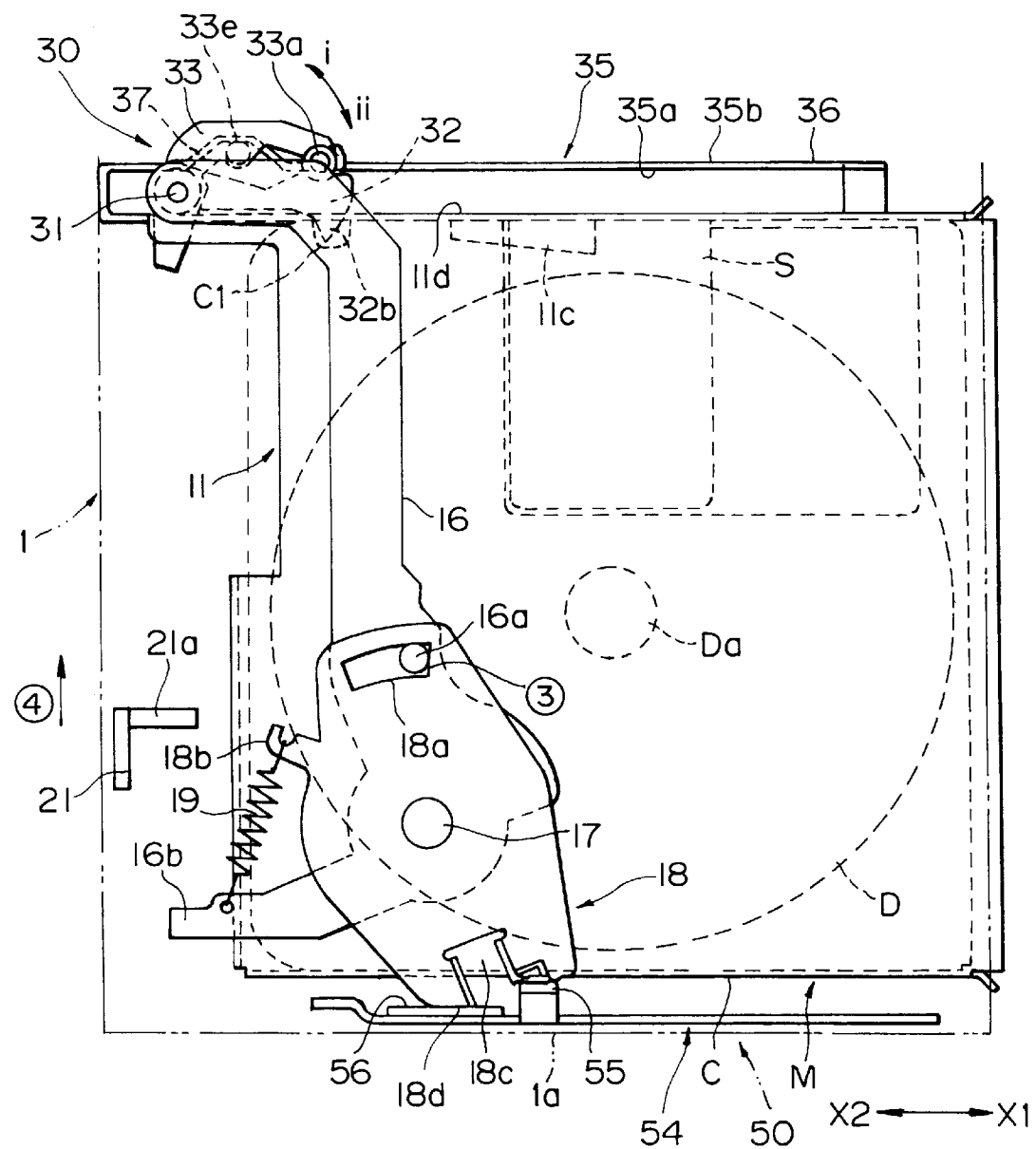
FIG. 5 is a plan view showing the disc device at the completion of a disc pulling operation, in a reproduction mode and in a recording mode.

FIGS. 4 and 5 are respectively plan views of the disc device, FIG. 4 showing the disc device with its cartridge loaded and FIG. 5 showing the disc device with its cartridge in its fully pulled state in a reproduction mode and a recording mode.

Figure 6:
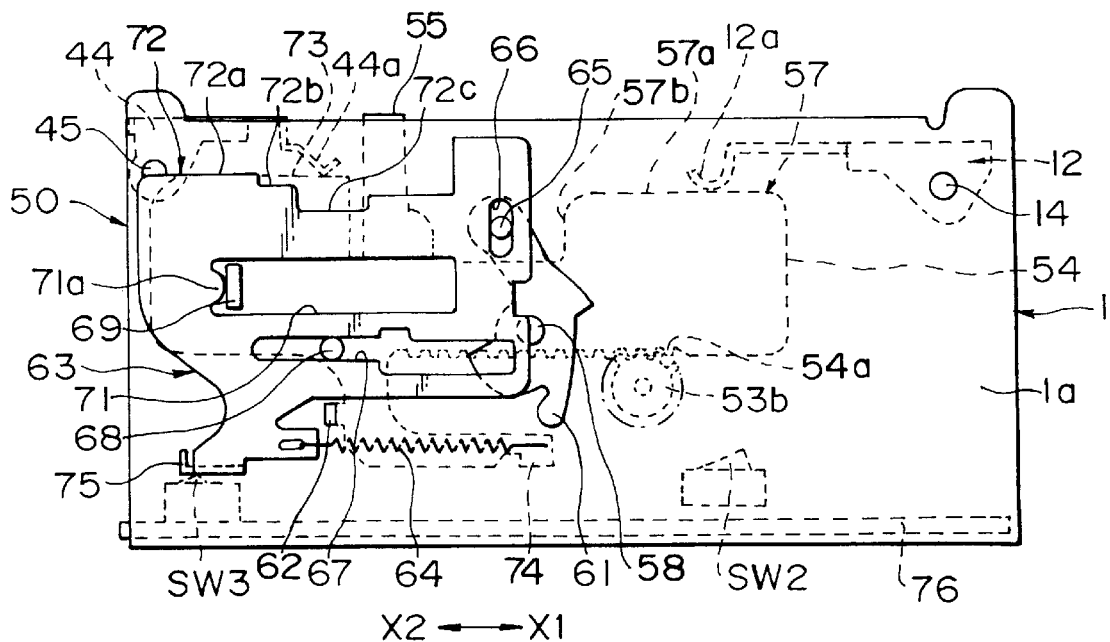
FIG. 6 is a side view of the disc device in an insertion and standby mode, taken along a line VI in FIG. 4.
Figure 7:
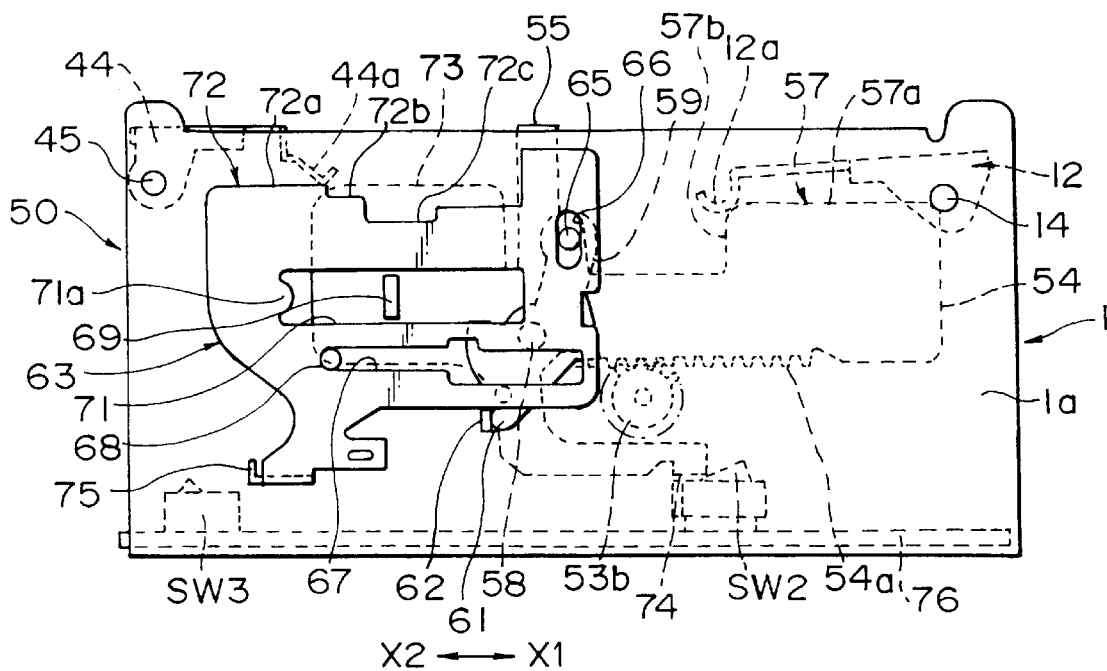
FIG. 7 is a side view when the pulling of a cartridge is complete.
Figure 8:
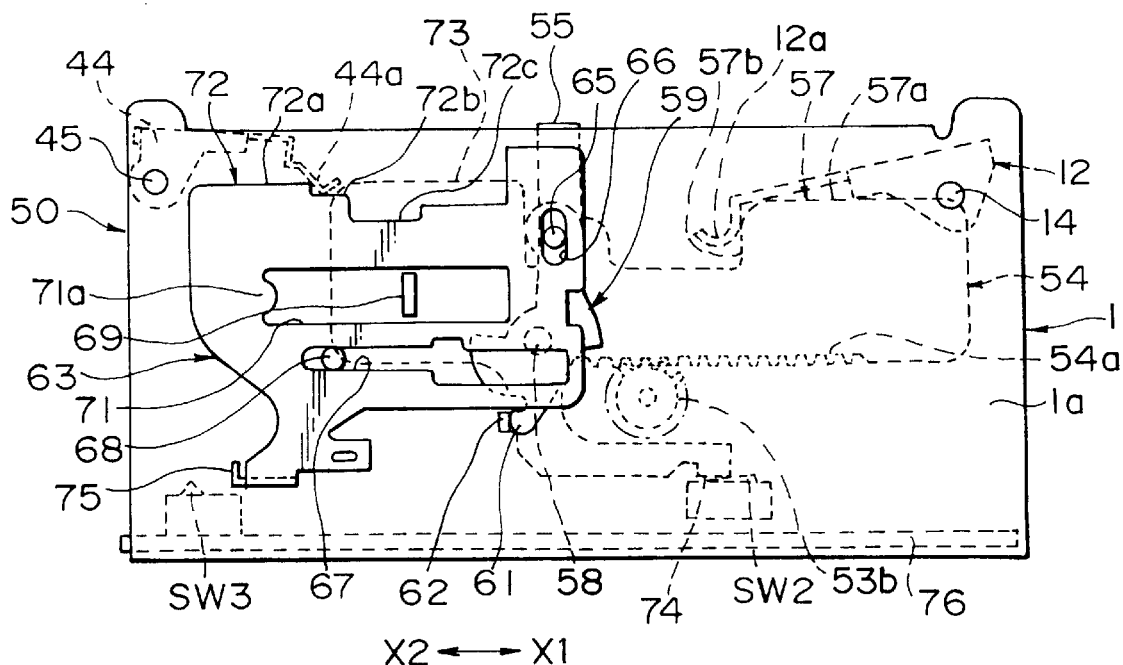
FIG. 8 is a side view showing the disc device in the reproduction mode.
Figure 9:
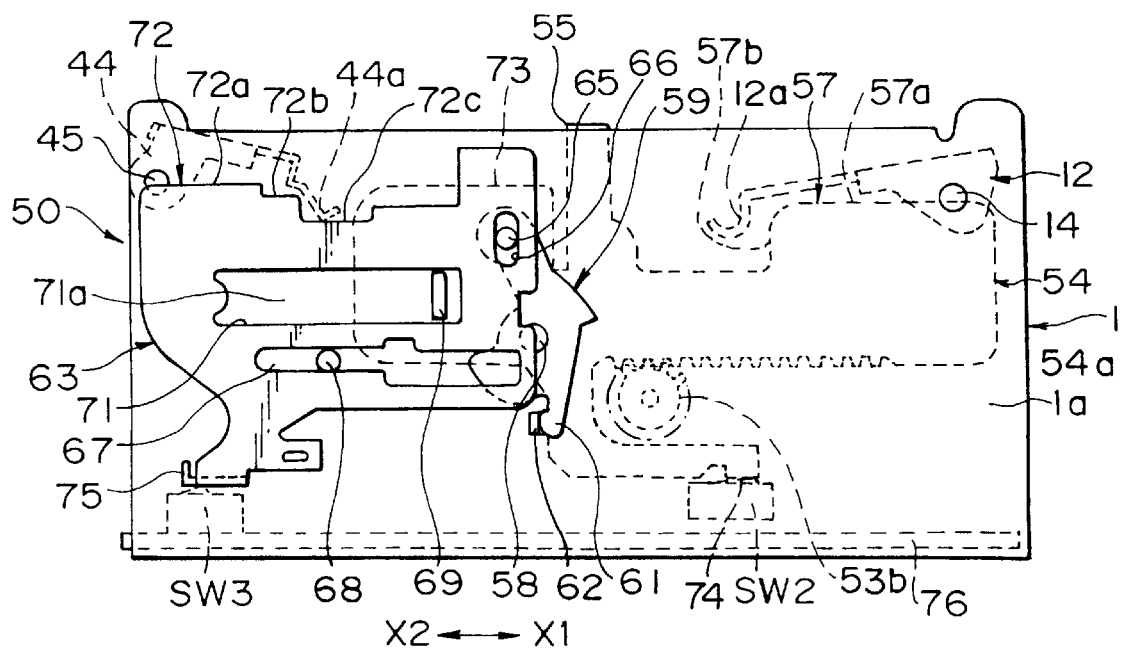
FIG. 9 is a side view showing the disc device in the recording mode.

FIGS. 6 through 9 are side views of the disc device viewed from the direction VI in FIG. 4, FIG. 6 shows the disc device with the disc inserted, corresponding to the state shown in FIG. 4, FIG. 7 shows the state of the disc device with the cartridge fully pulled into a cartridge holder, FIG. 8 shows the disc device in the reproduction mode and FIG. 9 shows the disc device in the recording mode.

Figure 10:
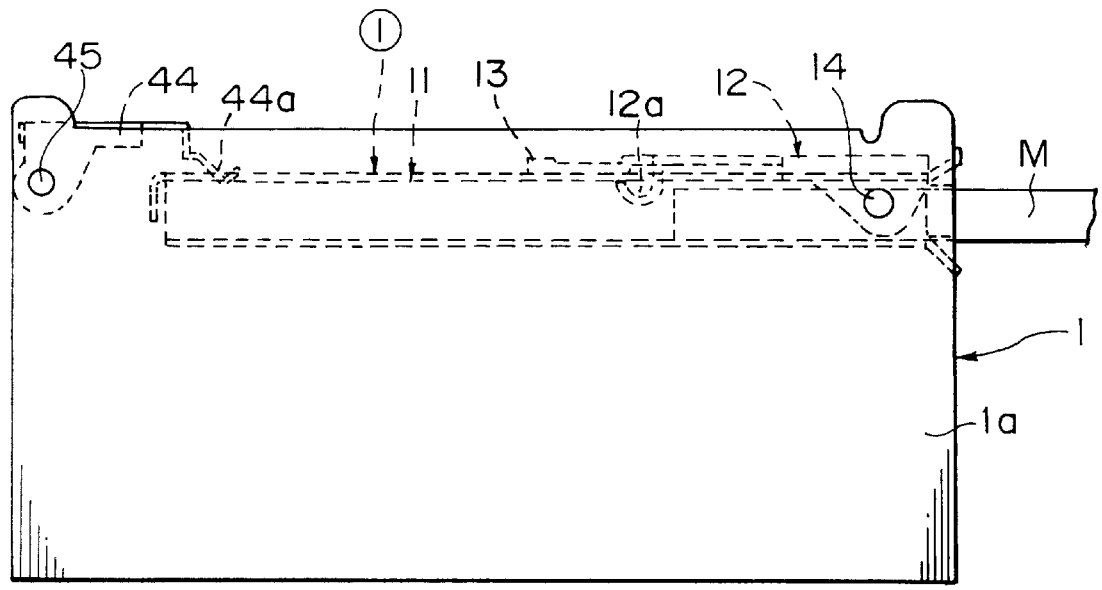
FIG. 10 is a side view showing a state in which a cartridge holder is in its insertion position.
Figure 11:
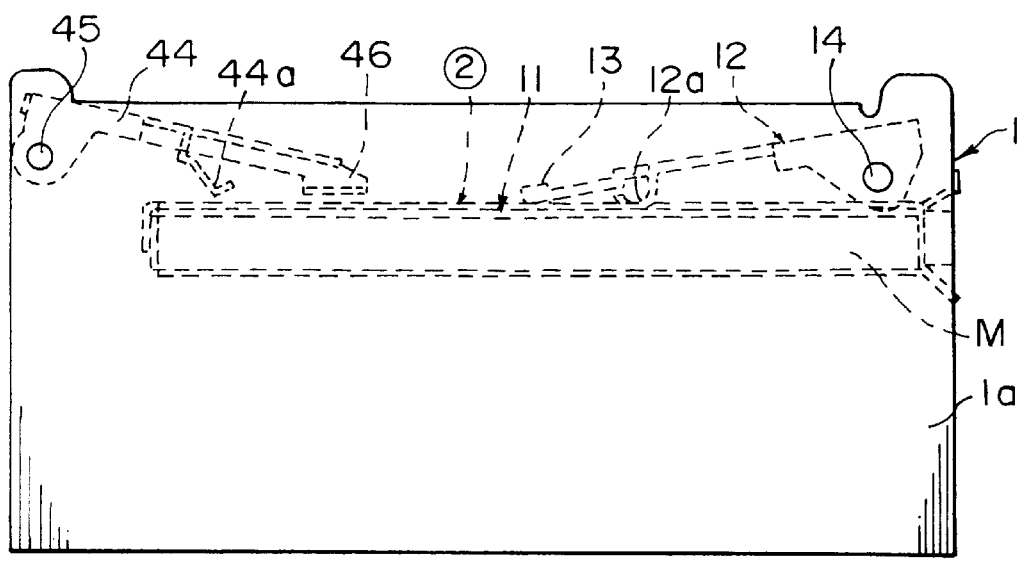
FIG. 11 is a side view showing a state in which the cartridge holder is in its load complete position.

FIGS. 10 and 11 are side views showing the operational status of the cartridge holder, FIG. 10 showing the disc device with the disc inserted, corresponding to FIG. 4, and FIG. 11 showing the disc device with the disc loading completed but viewed from the side of the disc device opposite to the side shown in FIGS. 8 and 9.

Figure 12:
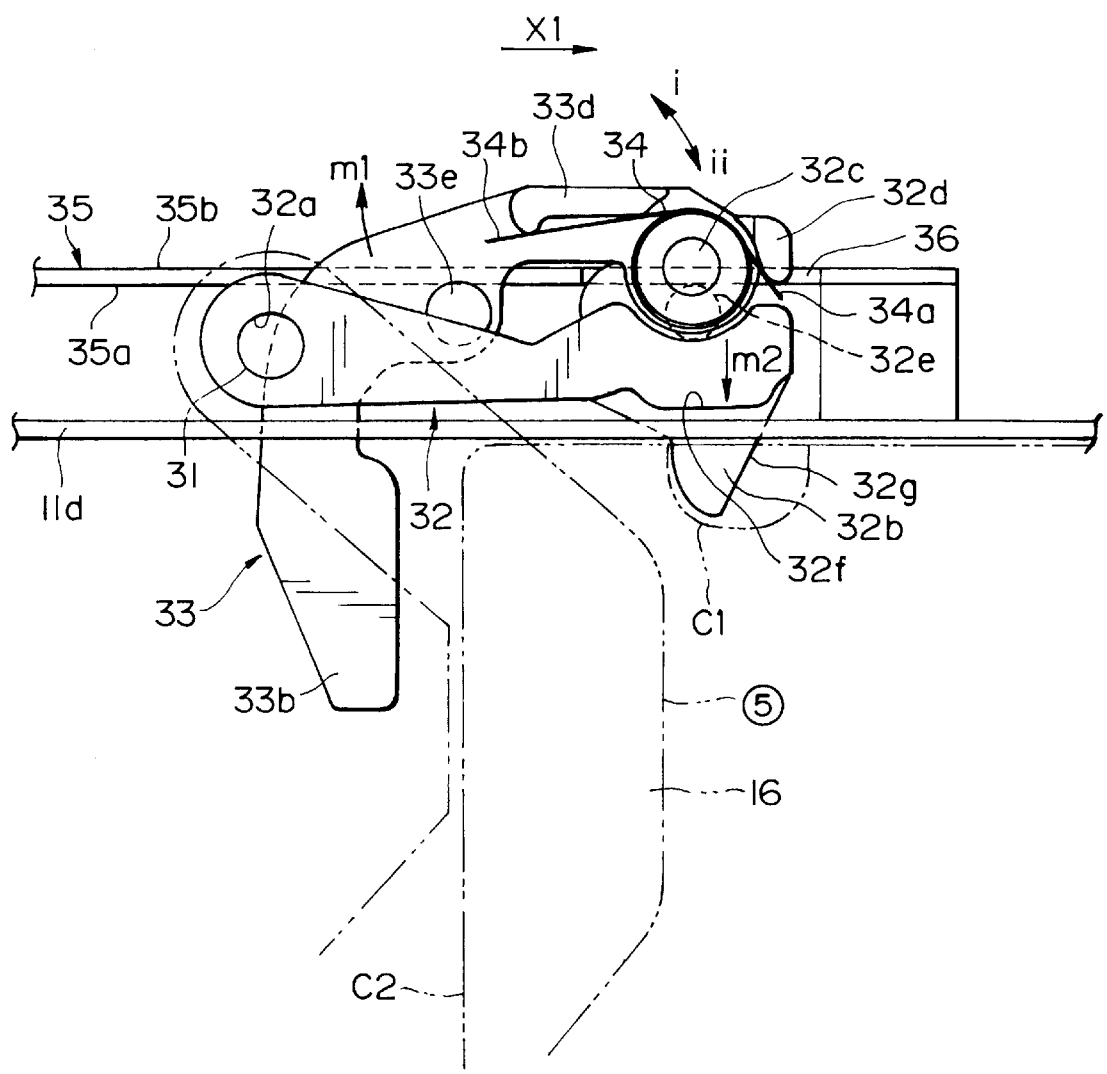
FIG. 12 is a plan view showing the pull/ejection mechanism in its cartridge insertion position.
Figure 13:
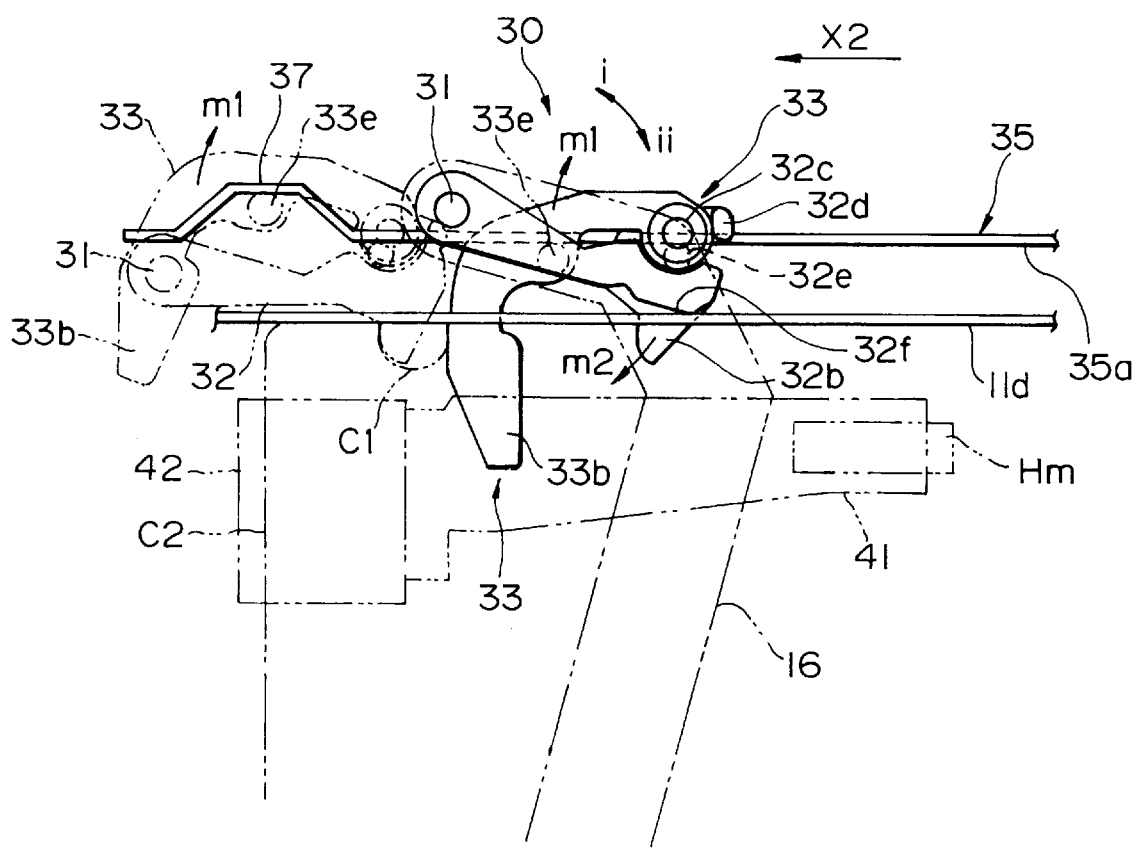
FIG. 13 is a plan view showing the pull/ejection mechanism in its cartridge pull complete position.
Figure 14:
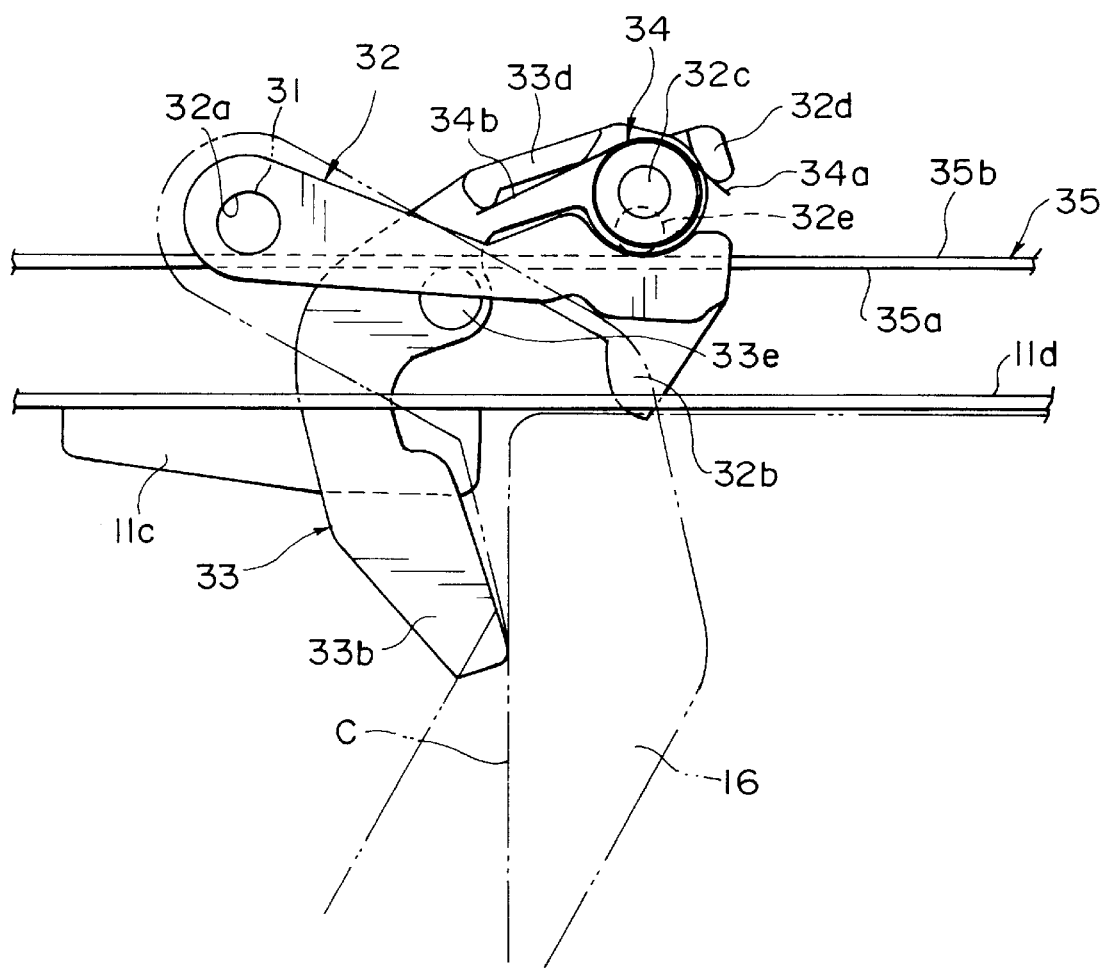
FIG. 14 is an enlarged plan view showing a state in which the cartridge is inserted in its incorrect direction.

FIG. 12 is an enlarged plan view showing a pull/ejection mechanism in the state shown in FIG. 4, FIG. 13 is an enlarged plan view showing the pull/ejection mechanism in the state shown in FIG. 5, and FIG. 14 is an enlarged plan view showing the pull/ejection mechanism with the cartridge inserted in its wrong orientation.

Figure 15:
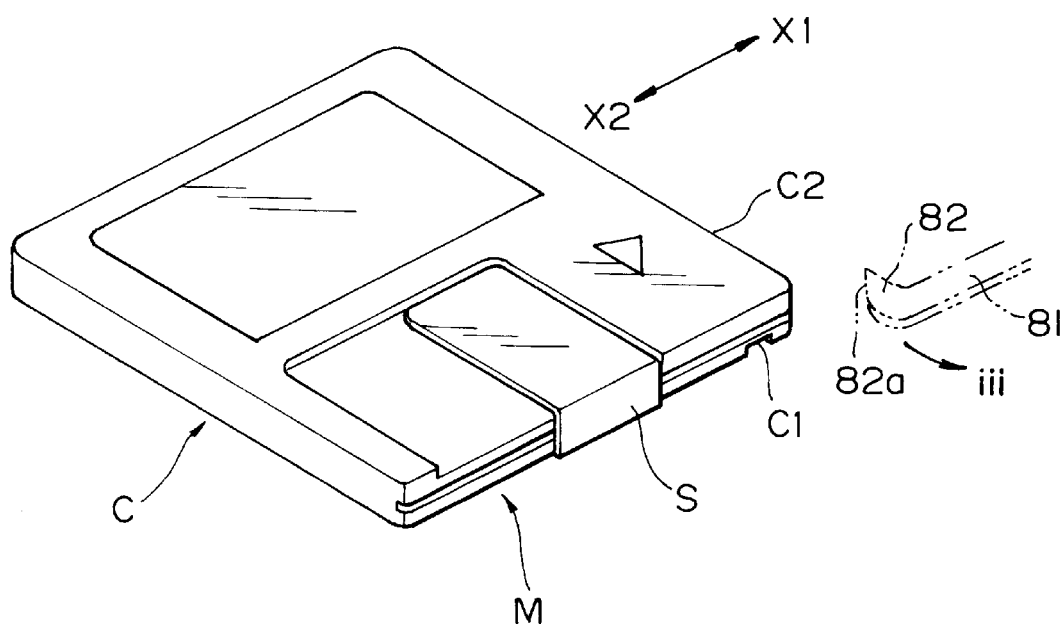
FIG. 15 is a perspective view of a Mini Disc as one example of the recording medium.

FIG. 15 is a perspective view of a Min Disc M as one example of the recording medium loaded in the disc device of the present invention with the direction of insertion oriented diagonally rightward upwardly.

The recording medium loaded in this disc device is a Mini Disc shown in FIGS. 4 and 15, in which a magneto-optical recording disc D is accommodated in a hard case, cartridge C having a generally square shape in its plan view. The cartridge C has on its underside an aperture that exposes a center hole (clamp hole) Da of the disc D. A shutter S is slidably supported on one side edge portion of the cartridge C, and when the shutter S is slid in the direction of the arrow shown in FIG. 4, a window formed in the cartridge C is seen. In a reproduction only Mini Disc M, a window appears on only the underside of the cartridge C, and an objective lens L of an optical head Ho shown in FIG. 1 faces the disc D inside through the window.

In a recordable Mini Disc M, windows appear on both top and bottom sides of the cartridge C when the shutter S is slid, exposing the disc inside through the top and bottom windows, respectively. When a recording is performed in the disc device, the objective lens L of the optical head Ho shown in FIG. 1 faces the bottom surface of the disc D through the bottom window of the cartridge C and a magnetic head Mm shown in FIG. 1 contacts the top surface of the disc D through the top window of the cartridge C.

Referring to FIGS. 4 and 6, the disc device has a box-like body 1. As shown in FIG. 4, the plan outline of the body 1 is shown by a chain line with one dot. FIG. 1 shows only a left-hand side plate 1a and a right-hand side plate 1b of the body 1 with its top plate and bottom plate not shown.

As shown in FIG. 1, a drive base 2 constituting a disc driving unit Kd is secured inside the body 1 at its middle level. Mounted on the drive base 2 is a clamp table 3, and a spindle 4 integrally formed with the clamp table 3 is rotatably supported by the drive base 2. Supported on the underside of the drive base 2 is a spindle motor (not shown) for rotating the spindle 4.

A guide shaft 5 is arranged on the drive base 2, and a guide rail 6a is integrally formed with a block 6 mounted on the drive base 2. Bearings 7 attached to the optical head Ho near one end are slidably supported by the guide shaft 5, a slide section 8 arranged on the other end of the optical head Ho is slidably supported by the guide rail 6a, and the optical head Ho is thus movable radially across a disc D clamped onto the clamp table 3. A sled motor M1 is attached on the underside of the drive base 2, the output shaft of the sled motor M1 is projected upward out of the top surface of the drive base 2, and a pinion gear 9 is secured to the output shaft of the motor M1 above the drive base 2. Further arranged above the drive base 2 is a reduction gear group 10 which is meshed with the pinion gear 9, the rotary motion of the reduction gear group 10 is transmitted to a rack (not shown) integrally formed with the optical head Ho, and the optical head Ho is thus reciprocated along the guide shaft 5 and the guide rail 6a.

Formed on top of the block 6 is a support surface 6b for supporting the loaded cartridge C from its underside, and an alignment pin 6c to be received within an alignment hole formed in the cartridge C is integrally formed with the block 6.

A cartridge holder 11 is arranged above the disc driving unit Kd. The cartridge holder 11 is produced by folding sheet metal, and has guide sections 11a, 11b on both sides, respectively, and a shutter release member 11c for causing the shutter S to slide on the Mini Disc M is integrally formed with the guide section 11b on its inside.

A holder support member 12 is arranged on the cartridge holder 11. The holder support member 12 on one end is engaged with connector sections 13, 13 on the top surface of the cartridge holder 11, and is foldably (pivotally) connected to the cartridge holder 11 by the connector sections 13, 13. Shafts 14, 14 are attached to left and right fold sections of the holder support member 12, and are respectively pivotally supported by both side plates 1a, 1b of the body 1.

When the holder support member 12 is horizontal as shown in FIG. 10, the cartridge holder 11, lifted upward above the drive base 2, is at its cartridge insertion position indicated by number 1 circled as shown. When the holder support member 12 is counterclockwise pivoted as shown in FIG. 11, the cartridge holder 11 is lowered to a load complete position indicated by number 2 circled. The cartridge C held in the cartridge holder 11 is loaded on the drive base 2 of the disc driving unit Kd, and is positioned by the support surface 6b and the alignment pin 6c. The holder support member 12 is urged toward the load complete position indicated by the number 2 circled (toward the drive base 2) by a spring 15 as an urging member. Integrally formed with the holder support member 12 on its side is a lifting portion 12a for lifting both the holder support member 12 itself and the cartridge holder 11 up to the cartridge insertion position indicated by the number 1 circled.

A pull/ejection arm 16 is rotatably supported about a shift 17 on the cartridge holder 11, and a pull/ejection mechanism 30 is attached to one end of the pull/ejection arm 16. More particularly, the pull/ejection arm 16 functions as a driving member for reciprocating the pull/ejection mechanism 30. An arm differential member 18 is stacked above the pull/ejection arm 16, and is supported by the same shaft 17 as the pull/ejection arm 16. The arm differential member 18 is provided with a differential slot 18a, which is of a semi-circular arc shape centered on the shaft 17 extending by a predetermined sector angular length, and a differential projection 16a formed on the pull/ejection arm 16 is inserted into the differential slot 18a.

A push portion 16b is integrally formed with the pull/ejection arm 16, and a spring anchor portion 18b is integrally formed with the arm differential member 18, and a connecting spring 19 connects the push portion 16b to the spring anchor portion 18b. The contraction force of the connecting spring 19 urges the pull/ejection arm 16 to pivot counterclockwise toward the arm differential member 18 with the differential projection 16a engaged the clockwise end of the differential slot 18a indicated by number 3 circled. A driving notch 18c is formed in the arm differential member 18, and rising flange portions are upward extended from the notch edge, and a restriction member 18d is formed to the edge of the driving-notch 18c.

An insertion sensing arm 21 is pivotally supported about a shaft 22 on the drive base 2, and a first switch SW 1 to be activated by the insertion sensing arm 21 is disposed on the underside of the drive base 2. A projection 21a on the top end of the insertion sensing arm 21 is engaged with the push portion 16b of the pull/ejection arm 16.

When the pull/ejection arm 16 is the most clockwise pivoted to its insertion and standby position of the cartridge C indicated by number 5 circled as shown in FIG. 4, the insertion sensing arm 21 is pushed to the direction indicated by number 4 circled by the push portion 16b, and the switch SW1 is turned to "ON" by the lower end of the insertion sensing arm 21. The cartridge C is inserted into the cartridge holder 11, the insertion force pivots the pull/ejection arm 16 to a position indicated by number 6 circled while the pressure the push portion 16b exerts on the insertion sensing arm 21 is released, the insertion sensing arm 21 is pivoted in the direction opposite to the direction indicated by the number 4circled by the internal reaction force generated in the switch SW1 or by an unshown spring urging the insertion sensing arm 21, and the switch SW1 is turned to "OFF". Turning switch SW1 to "OFF" activates a mode switching motor M2 and thus starts the pulling operation for the cartridge C.

FIG. 3 shows the pull/ejection mechanism 30 arranged on the one end of the pull/ejection arm 16.

In the pull/ejection mechanism 30, a support shaft 31 is secured to the end of the pull/ejection arm 16, and pivotally supports a pull member 32 about the support hole 32a of its base. A locking projection (locking pawl) 32b is integrally formed with the pull member 32. As shown in FIGS. 2 and 12, the locking projection 32b is projected inwardly below the lower end of the side plate 11d of the cartridge holder 11, and is engageable with a locking notch C1 formed in the side of the cartridge C.

A connecting shaft 32c is integrally formed with the pull member 32 on its front upper portion, and an ejection member 33 at the connection hole 33a of its base is pivotally supported about the connecting shaft 32c. A push portion 33b is integrally formed with the ejection member 33 at its front, and the push portion 33b is projected inwardly into the cartridge holder 11 through below the pull member 32 and the side plate 11d.

A coil spring 34 is attached around a boss 33c that defines the connection hole 33a of the ejection member 33, one end 34a of the coil spring 34 is anchored to a spring anchor portion 32d of the pull member 32, and the other end 34b of the coil spring 34 is anchored to a spring anchor portion 33d of the ejection member 33. The elastic force of the coil spring 34 urges both the pull member 32 and the ejection member 33 to pivot about their connecting shaft 32c in the directions that widen the angle therebetween.

As shown in FIG. 12, a first sliding shaft 32e is integrally formed with the pull member 32 on its lower side portion, and is slightly offset from the connecting shaft 32c, and a second sliding shaft 33e is integrally formed with the ejection member 33 on the center of its underside portion. As shown in FIG. 4, a guide plate 35 is integrally formed with the side plate 11d of the cartridge holder 11 on its outside, and the guide plate 35 is connected to the cartridge holder 11. Referring to FIG. 3, the inner surface of the guide plate 35 facing the cartridge holder 11 constitutes a guide surface (guide section) 35a along which both sliding shafts 32e, 33e slide, and the outer surface of the guide plate 35 constitutes an escape guide surface (escape guide section) 35b along which the first sliding shaft 32e slides when the cartridge holder 11 is inserted in its wrong orientation.

A cutout 36 is formed on the front end portion of the guide plate 35 in the X1 direction (on the insertion port side for the cartridge), and is a division point where the escape guide surface 35b branches off from the guide surface 35a, and, as a retraction section, a recess 37 is integrally formed with the guide plate 35 on the other end portion in the X2 direction (corresponding to the inserted far deep end side for the cartridge).

Referring FIG. 12 that is a partially enlarged view of the disc device shown in FIG. 4, the pull/ejection arm 16 is at the insertion and standby position indicated by the number 5 circled, and the first sliding shaft 32e of the pull/ejection mechanism 30 is positioned at the cutout 36 (division point) while the second sliding shaft 33e touches the guide surface 35a of the guide plate 35. The coil spring 34 urges the pull member 32 and the ejection member 33 to pivot about the connecting shaft 32c in the directions that widen the angle therebetween. With this elastic force in a state shown in FIG. 12, a moment in a direction of m1 acts on the ejection member 33 about the connecting shaft 32c as its fulcrum, its counterforce acts about the second sliding shaft 33e as a fulcrum, a moment in a direction of m2 acts on the connecting shaft 32c and pull member 32 about the support shaft 31. As a result, a slide surface 32f of the pull member 32 is urged toward the outer surface of the side plate 11d, and the locking projection 32b formed integrally with the slide surface 32f on its lower portion is projected into the cartridge holder 11 through below the side plate 11d, and is elastically engaged with the locking notch C1 of the cartridge C.

When both the first sliding shaft 32e and the second sliding shaft 33e are in contact with the guide surface 35a of the guide plate 35 as shown by a solid line in FIG. 13, the second sliding shaft 33e slides along the guide surface 35a while being urged by the moment in the m1 direction. The locking projection 32b of the pull member 32 is under a force in a direction of (i) from the locking notch C1 of an X2 side wall of the cartridge C. Since the first sliding shaft 32e of the pull member 32 is received by the guide surface 35a and slides along the guide surface 35a, the locking projection 32b is prevented from being disengaged from the locking notch C1. In this way the pull/ejection mechanism 30 moves in the X1/X2 directions in response to the pivotal motion of the pull/ejection arm 16 while being restrained by the side plate 11d and the guide plate 35.

As shown by a chain line with two dots in FIG. 13, when the pull/ejection mechanism 30 reaches the end of the guide plate 35 in the X2 direction with the second sliding shaft 33e arriving at the recess (retraction) 37 of the ejection member 33, the moment m1 pushes the second sliding shaft 33e into the recess 37, the ejection member 33 is clockwise pivoted, and the push portion 33b is retracted sideward from within the cartridge holder 11.

As shown in FIG. 1, the magnetic head Hm is supported by a plate spring 41 and the plate spring 41 is connected to the top end of a head base 42. The head base 42 is secured to a movable base 43 which moves integrally with the optical head Ho. Both the optical head Ho and the magnetic head Hm integrally move along the guide shaft 5 and the guide rail 6a, and the magnetic head Hm is urged by the plate spring 41 so that the magnetic head Hm is lowered toward the optical head Ho.

As shown in FIG. 1, a magnetic head lifting member 44 is arranged above the cartridge holder 11. The magnetic head lifting member 44 at its support holes 45, 45 are rotatably supported by the left-hand side plate 1a and right-hand side plate 1b of the body 1. The head base 42 is allowed to move within a window 44b of the magnetic head lifting member 44 in the longitudinal direction of the guide shaft 5, and the plate spring 41 rides on a slide portion 46 of the magnetic head lifting member 44. The elastic force of the plate spring 41 urges the magnetic head lifting member 44 to pivot clockwise about the support holes 45, 45.

Arranged on the left-hand side plate 1a of the body 1 is mode switching means 50, driven by the mode switching motor M2, for controlling the pull/ejection arm 16 cartridge holder 11, and magnetic head lifting member 44 to set the modes of operation.

Referring to FIG. 1, a worm gear 51 is secured to the output shaft of the mode switching motor M2 arranged on the underside of the drive base 2, and the worm gear 51 is in mesh with a worm wheel 52a, with which a worm gear 52b is integrally formed. A pinion gear 53b is integrally formed with a worm wheel gear 53a.

Referring to FIG. 2, a first switching lever 54 is horizontally slidably supported (in the X1/X2 directions) inside the left-hand side plate 1a of the body 1. A rack 54a is integrally formed with the first switching lever 54, and the pinion gear 53b meshes with the rack 54a, and the first switching lever 54 is driven in the X1 direction or X2 direction under the rotary power of the mode switching motor M2.

The first switching lever 54 is provided with a vertically extending arm drive section 55, and the arm drive section 55 is received within the driving notch 18c formed in the arm differential member 18 shown in FIG. 4. The first switching lever 54 has a restriction portion (restriction surface) 56 projected inwardly into the device and to the X2 direction of the arm drive section 55. When the first switching lever 54 moves in the X1 direction as shown in FIG. 5, the arm differential member 18 and pull/ejection arm 16 are counterclockwise driven by the arm drive section 55, and when the arm drive section 55 comes off from the driving notch 18c, the restriction member 18d of the arm differential member 18 abuts the restriction portion 56, and the arm differential member 18 is locked at its angle of rotation shown in FIG. 5.

The first switching lever 54 has on its upper side a holder control section 57. The holder control edge 57 has a slide edge 57a and a recess edge 57b next to it. When the lifting portion 12a of the holder support member 12 rides on the slide edge 57a as shown in FIG. 6, the cartridge holder 11 is raised to the cartridge insertion position indicated by the number 1 circled as shown in FIG. 10, and when the first switching lever 54 is moved in the X1 direction and arrives at the recess edge 57b, the elastic force of the spring 15 lowers the cartridge holder 11 to the load complete position indicated by the number 2 circled as shown in FIG. 11.

Referring to FIG. 2, a shaft 58 is fixed to the outer surface of the left-hand side plate 1a, and an inverting link 59 as the inverting member is pivotally supported by the shaft 58. A pressure portion 62, bent from the first switching lever 54, is projected outward out of the left-hand side plate 1a passing through a slot opened therein. The first switching lever 54 moves in the X1 direction, causing the pressure portion 62 to press against an abutment surface 61 on the lower side of the inverting link 59 and thereby pivoting counterclockwise the inverting link 59.

Also disposed outside the left-hand side plate 1a is a second switching lever 63. The second switching lever 63 is slidably supported in the X1/X2 directions by the left-hand side plate 1a. A driving spring 64, anchored between the second switching lever 63 and the left-hand side plate 1a, urges the second switching lever 63 in the X1 direction. An inverting drive shaft 65 is rigidly attached to the top end of the inverting link 59, and is received within a vertically extending slot 66 formed in the second switching lever 63. In the inverting link 59, the distance between the shaft 58 and the inverting drive shaft 65 is set to be longer than the distance between the shaft 58 and the abutment surface 61, a stroke of travel of the first switching lever 54 in the X1 direction is amplified and transmitted to the second switching lever 63 via the inverting link 59, and thus the second switching lever 63 is driven in the X2 direction.

The second switching lever 63 has a guide slot 67 extending in the X1/X2 directions, and a guide stopper 68 is rigidly attached to the left-hand side plate 1a is received in the guide slot 67. As shown in FIG. 7, the second switching lever 63 moves in the X1 direction, and its movement in the X1 direction is restrained at the moment the guide stopper 68 abuts the guide slot 67 at its end in the X2 direction as shown in FIG. 7.

The second switching lever 63 has also a slot 71 extending in the X1/X2 directions. An abutment portion 69 bent from the first switching lever 54, passing through a slot opened in the left-hand side plate 1a, is projected outward out of the left-hand side plate 1a, and is then received in the slot 71. When the second switching lever 63 reaches the end of the left-hand side plate 1a in the X2 direction as shown in FIG. 6, the abutment portion 69 of the first switching lever 54 presses against a follower abutment portion 71a of the slot 71 in the X2 direction, and the first switching lever 54 thus pushes the second switching lever 63 in the X2 direction.

The second switching lever 63 has on its top side a magnetic head controller 72. The magnetic head controller 72 has a first slide edge 72a as the standby section, a second slide edge 72b as the reproduction setting section, slightly lower in position than the first slide edge 72a, and a recess edge 72c as the recording mode setting section. The first switching lever 54 has on its top side a slide portion 73 that is part of the magnetic head control portion, and the slide portion 73 functions the standby section as well. As shown in FIG. 6, the first slide edge 72a and the slide portion 73 are approximately collinear at the same level in position.

When a lifting portion 44a formed in the magnetic head lifting member 44 rides on the slide portion 73 of the first switching lever 54 as shown in FIG. 6, or when the lifting portion 44a rides on the first slide edge 72a as shown in FIG. 7, the magnetic head lifting member 44 stays in its horizontal position with its slide portion 46 lifting the plate spring 41 and the magnetic head Hm. When the lifting portion 44a rides on the second slide edge 72b as shown in FIG. 8, the second switching lever 63 is slightly clockwise pivoted, and the reproduction mode is entered where the magnetic head Hm is spaced modestly apart from the disc D. When the lifting portion 44a falls within the recess edge 72c as shown in FIG. 9, the magnetic head lifting member 44 is further clockwise pivoted, and the magnetic head Hm is put contact with the top surface of the disc D to set the recording mode.

Referring to FIG. 6, a circuit board 76 is mounted in the bottom of the body 1, and has on its X1 side a second switch SW2 for sensing that the reproduction mode is entered. The switch SW2 is activated by a trigger portion 74 formed in the first switching lever 54. Disposed at the end of the circuit board 76 in the X2 direction is a third switch SW3 for sensing the start and end of the operation of the switching means (50) comprising the motor M2 up to the second switching lever 63. The third switch SW3 is activated by a trigger portion 75 provided on the second switching lever 63.

The operation of the disc device is now discussed.

The rotary power of the mode switching motor M2 shown in FIG. 1 is transmitted to the worm wheel 53a via the worm gear 51, worm wheel 52a, and worm gear 52b, and the pinion gear 53b is thus driven at a reduced speed but at a high torque. Since the pinion gear 53b meshes with the rack 54a, the resulting power drives the first switching lever 54 at a reduced speed in the X1/X2 directions.

An electric control unit controls the mode switching motor M2 in response to the sense outputs from the switches SW1, SW2 and SW3.

The mode switching motor M2 starts running when the first switch SW1 for sensing the insertion of the cartridge C is turned to "OFF". When the first switching lever 54 of the mode switching means 50 moves in the X1 direction with the mode switching motor M2 running, the device is switched sequentially in the following order: "insertion and standby mode"→"disc cartridge pulling operation"→"load complete mode"→"reproduction mode"→"recording mode".

To set the reproduction mode as shown in FIG. 8, the motor M2 stops at the moment the second switch SW2 is turned to "ON" after verifying that the third switch SW3 is turned to "OFF". To set the recording mode as shown in FIG. 9, the second switch SW2 is turned to "ON" after the third switch SW3 is turned to "OFF" and the mode switching motor M2 stops at the moment the third switch SW3 is turned to "ON" again.

Insertion and Standby Mode

An insertion and standby mode is shown in FIGS. 4, 6, 10 and 12.

In the insertion and standby mode, the first switching lever 54 remains shifted in the X2 direction as shown in FIG. 6. The abutment portion 69 formed in the first switching lever 54 presses against the follower abutment portion 71a of the second switching lever 63 in the X2 direction, and the second switching lever 63 is shifted to its end position in the X2 direction. The third switch SW3 is turned to "ON" by the trigger portion 75 of the second switching lever 63.

Since the arm drive section 55 formed in the first switching lever 54 is received within the driving notch 18c of the arm differential member 18, the arm drive section 55 shifted in the X2 direction pivots clockwise the arm differential member 18 as shown in FIG. 4. The pull/ejection arm 16 linked to the arm differential member 18 via the connecting spring 19 is clockwise pivoted to the insertion and standby position indicated by the number 5 circled.

Referring to FIG. 12, the pull/ejection mechanism 30 provided on the end of the pull/ejection arm 16 is shifted to the X1 side end position of the guide plate 35 facing the side plate 11d of the cartridge holder 11. The first sliding shaft 32e provided on the underside of the pull member 32 is positioned at the division point where the escape guide surface 35b branches off from the guide surface 35a, and the second sliding shaft 33e provided on the underside of the ejection member 33 is in contact with the guide surface 35a, namely the inner surface of the guide plate 35. The moment m1 generated by the torsion coil spring 34 presses the second sliding shaft 33e against the guide surface 35a, the moment m2 arising from the counterforce to the moment m1 presses the slide surface 32f of the pull member 32 against the side plate 11d, and the locking projection 32b is projected through below the side plate 11d into the cartridge holder 11.

The lifting portion 12a rides on the slide edge 57a of the holder control section 57 of the first switching lever 54 as shown in FIG. 6, and the holder support member 12 having the lifting portion 12a remains in its generally horizontal position as shown in FIG. 10, and the cartridge holder 11 is lifted above the drive base 2 to the cartridge insertion position indicated by the number 1 circled.

The lifting portion 44a rides on the slide portion 73 that is part of the magnetic head control portion of the first switching lever 54, causing the magnetic head lifting member 44 to be in its generally horizontal position. The slide portion 46 of the magnetic head lifting member 44 lifts the plate spring 41 supporting the magnetic head Hm, and the magnetic head Hm is lifted high up above the optical head Ho.

Sensing of the Cartridge Insertion

When the cartridge C having a Mini Disc M therein is inserted into the cartridge holder 11 as shown in FIGS. 4 and 12, the forward edge C2 of the cartridge C abuts a diagonal surface 32g, facing the X2 direction, of the locking projection 32b formed on the pull member 32 in the pull/ejection mechanism 30, and the diagonal surface 32g is moved, pushing the pull member 32 in a direction of (i). In the state shown in FIGS. 4 and 12, the first sliding shaft 32e on the underside of the pull member 32 is at the cutout 36 of the guide plate 35, and the pushing the edge of the cartridge C exerts on the locking projection 32b pivots the pull member 32 about the support shaft 31 in the direction of (i). When the locking notch C1 of the cartridge C reaches the locking projection 32b, the pull member 32 is pivoted in a direction of (ii) by the moment m2 generated by the torsion coil spring 34, and the locking projection 32b is engaged with the locking notch C1 of the cartridge C.

When the cartridge C is further inserted in the X2 direction, the pull/ejection arm 16 is counterclockwise pivoted. Since the arm differential member 18 is now restrained by the arm drive section 55 of the first switching lever 54, the pull/ejection arm 16 only is pivoted to the position indicated by the number 4 circled in FIG. 4 with its differential projection 16a moving along the differential slot 18a in the arm differential member 18 while the connecting spring 19 is expanded. When the pull/ejection arm 16 is counterclockwise pivoted, the push portion 16b parts from the insertion sensing arm 21, and the insertion sensing arm 21 that was heretofore urged in the direction indicated by the number 4 circled is moved in the direction opposite to the direction indicated by the number 4 circled, and the bottom end of the insertion sensing arm 21 clears the first switch SW1, turning the first switch SW1 to "OFF".

When the first switch SW1 is turned to "OFF" from "ON", the mode switching motor M2 that stopped heretofore starts running.

Pulling Operation for the Cartridge

When the mode switching motor M2 starts running with the first switch SW1 turned to "OFF", the rotary power of the pinion gear 53b shown in FIGS. 1 and 6 is transmitted to the rack 54a in the mode switching means 50, driving the first switching lever 54 in the X1 direction. Since the driving spring 64 urges the second switching lever 63 in the X1 direction, the first switching lever 54 moves in the X1 direction integrally with the second switching lever 63 with the follower abutment portion 71a kept in contact with the abutment portion 69, in an initial phase in which the first switching lever 54 moves in the X1 direction from the insertion and standby mode shown in FIG. 6.

When the first switching lever 54 moves in the X1 direction, the arm drive section 55 pivots counterclockwise the arm differential member 18, and the pull/ejection arm 16 linked to the arm differential member 18 by the connecting spring 19 starts pivoting counterclockwise. In the pull/ejection mechanism 30 provided at the end of the pull/ejection arm 16, both the first sliding shaft 32e and the second sliding shaft 33e slide along the guide surface 35a of the guide plate 35 in the X2 direction. The first sliding shaft 32e slides along the guide surface 35a, the locking projection 32b is reliably engaged with the locking notch C1 of the cartridge C, and the force of the pull/ejection mechanism 30 in the X2 direction pulls the cartridge C into the cartridge holder 11 in the X2 direction.

In the middle of pulling the cartridge C into the cartridge holder 11 in the X2 direction, the forward edge of the shutter S of the cartridge C touches the shutter release member 11c bent inwardly from the side plate 11d of the cartridge holder 11. Its motion relative to the cartridge C further pulled in the X2 direction, the shutter S is forced to be opened, and the window of the cartridge C is opened exposing the disc D inside.

FIG. 7 shows a state of the device immediately after the pulling operation for the cartridge C is complete. As shown in FIG. 7, the first switching lever 54 moves by a predetermined distance in the X1 direction, the second switching lever 63 driven by the driving spring 64 also moves by a predetermined distance in the X1 direction, one end of the guide slot 67 formed in the second switching lever 63 touches the guide stopper 68 formed in the left-hand side plate 1a, and a further movement of the second switching lever 63 in the X1 direction is restrained. In the state shown in FIG. 7, the lifting portion 44a that has heretofore slid along the slide portion 73 of the first switching lever 54 is transferred to the first slide edge 72a of the magnetic head controller 72 in the second switching lever 63. At this point shown in FIG. 7, the magnetic head lifting member 44 is in its horizontal position, and the plate spring 41 supporting the magnetic head Hm remains lifted high.

During the transition from the insertion and standby mode shown in FIG. 6 to the completion of the cartridge pulling operation shown in FIG. 7, the lifting portion 12a of the holder support member 12 slides on the slide edge 57a of the first switching lever 54, and the cartridge holder 11 remains lifted at the insertion position indicated by the number 1 circled as shown in FIG. 10.

In the cartridge pulling operation, the arm drive section 55 of the first switching lever 54 pivots counterclockwise the arm differential member 18 and the pull/ejection arm 16 as shown in FIG. 5, and after the cartridge C is fully pulled to the end of the cartridge holder 11 in the X2 direction by the pull/ejection mechanism 30, the arm drive section 55 is disengaged out of the driving notch 18c of the arm differential member 18 into the X1 direction, and the restriction port 56 of the first switching lever 54 abuts the restriction member 18d of the arm differential member 18. The arm differential member 18 is thus locked without being pivoted.

Reproduction Mode

To set the reproduction mode, the first switching lever 54 is further driven in the X1 direction from its position shown in FIG. 7, the trigger portion 74 provided on the first switching lever 54 turns the second switch SW2 to "ON" as shown in FIG. 8, the mode switching motor M2 then stops, and the operation of the mode switching means 50 stops, completing the setting of the reproduction mode.

The pressure portion 62 formed on the first switching lever 54 abuts the abutment surface 61 of the inverting link 59 in the state shown in FIG. 7. While the first switching lever 54 moves from its position shown in FIG. 7 to its position shown in FIG. 8, the force the first switching lever 54 exerts in the X1 direction pivots counterclockwise the inverting link 59, and the inverting drive shaft 65 formed on the inverting link 59 inverts the movement of the second switching lever 63 into the X2 direction.

In the state shown in FIG. 8, the second switching lever 63 is shifted by a short distance in the X2 direction from the state shown in FIG. 7, and the lifting portion 12a of the holder support member 12 comes off from the slide edge 57a and falls within the recess edge 57b of the holder control section 57 in the first switching lever 54. The holder support member 12 is released and counterclockwise pivoted about the shaft 14 by the elastic force of the spring 15 shown in FIG. 1, thereby lowering the cartridge holder 11. The cartridge C held in the cartridge holder 11 is placed on the support surface 6b and alignment pin 6c on the drive base 2, and the cartridge C is positioned and loading operation is completed. The center hole Da of the disc D in the cartridge C is clamped onto the clamp table 3 on the drive base 2.

Since the second switching lever 63 is shifted in the X2 direction in FIG. 8, the lifting portion 44a of the magnetic head lifting member 44 reaches the second slide edge 72b of the magnetic head controller 72 in the second switching lever 63. The magnetic head lifting member 44, now under the elastic force of the plate spring 41, is slightly clockwise pivoted from its horizontal position shown in FIG. 7, and the magnetic head Hm provided at the end of the plate spring 41 is lowered toward the cartridge C. The magnetic head Hm stops its lowering motion at a position slight distance above the top surface of the cartridge C so that the magnetic head Hm is prevented from touching the top surface of the cartridge C, for example, even when a cartridge of a reproduction-only type having no window on its top is loaded.

In the reproduction mode, the sled motor M1 provided on the drive base 2 shown in FIG. 1 starts running, the optical head Ho moves under the guidance of the guide shaft 5 and guide rail 6a, a laser light is directed via the objective lens L to the bottom surface of the disc D exposed with the shutter S opened, and the data recorded in the disc D is reproduced (read). Since the head base 42 moves integrally with the optical head Ho that is fixed to it, the plate spring 41 supported by the head base 42 slides on the slide portion 46 of the magnetic head lifting member 44. The magnetic head lifting member 44 is clockwise pivoted more than in the standby state shown in FIGS. 4 and 6, the slide portion 46 is lowered more down to the cartridge C, and the elastic force of the plate spring 41 supporting the magnetic head Hm exerted on the slide portion 46 is weaker than that in the standby state. The load of the sled motor M1 that drives the optical head Ho and the magnetic head Hm is accordingly reduced. Since the magnetic head Hm is put on standby at its lower position toward the disc D, the drop height of the magnetic head Hm down to its contact position to the disc D is shortened.

FIG. 13 shows the pull/ejection mechanism 30 in a chain line with two dots when the reproduction mode or the recording mode in succession to it is entered with the loading of the cartridge C completed. When the cartridge C is loaded, the pull/ejection mechanism 30 moves to the end portion of the guide plate 35 in the X2 direction. Since the first sliding shaft 32e provided on the pull member 32 is in contact with the guide surface 35a, namely the inner surface of the guide plate 35, the locking projection 32b formed in the pull member 32 remains engaged with the locking notch C1 of the cartridge C. For this reason, the cartridge C is reliably pulled to the end portion of the cartridge holder 11 in the X2 direction.

The second sliding shaft 33e of the ejection member 33 is pushed into the recess 37 of the guide plate 35 by the moment m1 generated by the coil spring 34. The ejection member 33 is thus clockwise pivoted, and the push portion 33b parts from the forward edge C2 of the cartridge C and is retracted (outwardly) upward as shown. As shown in FIG. 13, the magnetic head Hm and plate spring 41 and the head base 42 in broken lines are moved outside the outer circumference of the disc D defined by its radius, the recess 37 formed in the guide plate 35 permits the ejection member 33 to clockwise pivot much, and the push portion 33b is prevented from touching the head base 42.

At this moment the pulling operation for the cartridge C into the cartridge holder 11 is complete as shown in FIG. 7, the push portion 33b is shifted upward off the insertion forward edge C2 of the cartridge C. For this reason, even if the optical head Ho and the head base 42 move to the position shown in FIG. 13 along the forward edge C2 of the cartridge C in either the reproduction mode or the recording mode, the push portion 33b is kept away from the head base 42 and does not interfere with the movement of the head base 42.

Recording Mode

To set the recording mode, the first switching lever 54 is further moved in the X1 direction from its position shown in FIG. 8. The pressure portion 62 of the first switching lever 54 pivots counterclockwise the inverting link 59, the inverting drive shaft 65 of which drives the second switching lever 63 in the X2 direction. When the second switching lever 63 is shifted to the state shown in FIG. 9, the trigger portion 75 formed in the second switching lever 63 turns the third switch SW3 to "ON" again. The second switch SW2 is kept to "ON" by the trigger portion 74 of the second switching lever 63. In summary, as shown in FIG. 9, the second switch SW2 is turned to "ON", the third switch SW3 is turned to "ON", and the electric control unit, determining that the recording mode, is entered and stops the mode switching motor M2.

As shown in FIG. 9, the lifting portion 44a of the magnetic head lifting member 44 is received within the recess edge 72c of the magnetic head controller 72 in the second switching lever 63, and is engaged with the bottom of the recess edge 72c. The magnetic head lifting member 44 is further clockwise pivoted, causing its slide portion 46 to be lowered down to the disc D. The magnetic head Hm provided at the end of the plate spring 41 is introduced into the cartridge C through the window opened in the top surface of the cartridge C, the magnetic head Hm is put into contact with the top surface of the disc D by the elastic force of the plate spring 41, and the slide portion 46 of the magnetic head lifting member 44 parts downward from the plate spring 41.

Because the reproduction mode shown in FIG. 8 has to be entered before the recording mode, the magnetic head Hm is lowered by one step in the reproduction mode and is thereafter fully lowered in the recording mode. For this reason, the drop height of the magnetic head Hm reaching the recording mode is shortened, and the impact generated when the magnetic head Hm touches down the top surface of the disc D is reduced.

In the recording operation, the optical head Ho is moved by the sled motor M1, and along with it, the magnetic head Hm is moved, a magnetic field is applied on the top surface of the disc D by the magnetic head Hm and laser energy of a laser light is directed to the bottom surface of the disc D through the objective lens L of the optical head Ho, and data is thus recorded through optical modulation or magnetic modulation.

Ejection of the Cartridge

To eject the cartridge C from the reproduction mode shown in FIG. 8 or the recording mode shown in FIG. 9, the operation of the mode switching motor M2 for cartridge loading is reversed. The rotary power of the motor M2 is transmitted from the pinion gear 53b to the rack 54a, thereby driving the first switching lever 54 in the X2 direction. During the transition from the state shown in FIG. 9 to the state shown in FIG. 8, and then from the state shown in FIG. 8 to the state shown in FIG. 7, the first switching lever 54 returns slightly in the X2 direction, and the urging of the driving spring 64 is transmitted to the inverting link 59 via the second switching lever 63, thereby pivoting clockwise the inverting link 59. The second switching lever 63 moves in the X1 direction. The first switching lever 54 moves from the state shown in FIG. 7 in the X2 direction until the abutment portion 69 abuts the follower abutment portion 71a, and then both the first switching lever 54 and second switching lever 63 move in the X2 direction reverting back to the state shown in FIG. 6.

When the device reverts back to the state shown in FIG. 6, the trigger portion 75 of the second switching lever 63 turns the third switch SW3 to "ON". At this moment, the ejection of the cartridge C is complete, and the mode switching motor M2 stops.

In the above series of steps, during the transition from the reproduction mode shown in FIG. 8 or from the recording mode shown in FIG. 9 to the state shown in FIG. 7, the lifting portion 44a of the magnetic head lifting member 44 rides on the first slide edge 72a of the second switching lever 63, and the magnetic head lifting member 44 lifts the magnetic head Hm. While the state shown in FIG. 9 or FIG. 8 transitions to the state shown in FIG. 7, the lifting portion 12a of the holder support member 12 rides on the slide edge 57a of the first switching lever 54, lifting the cartridge holder 11 to the position shown in FIG. 10.

During the reversion from the state shown in FIG. 7 to the insertion and standby mode shown in FIG. 6, the arm drive section 55 of the first switching lever 54 is engaged with the driving notch 18c, pivoting clockwise the arm differential member 18 and pivoting clockwise the pull/ejection arm 16 as well. When the pull/ejection arm 16 pivots clockwise, the pull/ejection mechanism 30, of which state is shown in the chain line with two dots in FIG. 13, moves in the X1 direction, the second sliding shaft 33e moves out of the recess 37 and reaches the guide surface 35a immediately when the pull/ejection mechanism 30 starts to move, and the ejection member 33 is counterclockwise pivoted with its ejection member 33 ready to press against the edge of the cartridge C on the X2 side. During the transition from the state shown in FIG. 5 to the state shown in FIG. 4, the cartridge C is ejected by the push portion 33b. The pull/ejection arm 16 is fully pivoted to the standby position indicated by the number 5 circled as shown in FIG. 4, and when the cartridge C is completely ejected, the push portion 16b of the pull/ejection arm 16 pushes the insertion sensing arm 21 in the direction indicated by the number 4 circled, thereby turning the first switch SW1 to "ON". The ejection of the cartridge C is recognized at the moment the first switch SW1 is turned to "ON".

In the ejection operation, the mode switching motor M2 stops when the second switching lever 63 fully reverts back in the X2 direction with the third switch SW3 turned to "ON" as shown in FIG. 6. A determination of a complete ejection of the cartridge C is made by recognizing whether the first switch SW1 is turned to "ON". In this way the third switch SW3 senses the end of the operation of the mode switching means 50 driven by the mode switching motor M2, while the first switch SW1, rather than the third switch SW3, senses the ejection of the cartridge C. Since the sensing of the end of the operation of the mechanism of the mode switching means 50 and the sensing of the ejection of the cartridge C are performed by separate lines, the motor M2 and the mechanism are protected in the event of a malfunction such as an aborted ejection of the cartridge C.

Now it is assumed that the cartridge C is jammed within the cartridge holder 11 or unsuccessfully ejected in the X1 direction under an external force, during the transition from the state shown in FIG. 5 to the state shown in FIG. 4. In such a case, while the arm differential member 18 is clockwise pivoted by the first switching lever 54 to the state shown in FIG. 4, the pull/ejection arm 16 is forced to stop at a midway point by the jamming without being fully clockwise pivoted. The expansion of the spring 19 connecting the pull/ejection arm 16 to the arm differential member 18 prevent the mechanism from being locked. Even if the cartridge C is unsuccessfully ejected with the first switch SW1 failing to revert to "ON", the second switching lever 63 fully returns in the X2 direction, and the mode switching motor M2 stops at the moment the third switch SW3 is turned to "ON". In this way even if the cartridge C is not completely ejected, the mode switching motor M2 stops rather than continuously runs, and a subsequent trouble such as a damage of the motor or locking of the mechanism is precluded.

Incorrect Insertion of the Cartridge

FIG. 14 shows a state of the cartridge C which is inserted in a wrong direction in the insertion and standby mode shown in FIGS. 4 and 6, more particularly the cartridge C is inserted with its backward edge forward in FIG. 4. When the cartridge C is inserted with its backward edge front, the side having no shutter S is forced to face the shutter release member 11c, and the shutter release member 11c abuts the insertion edge of the cartridge C, blocking the insertion of the cartridge C. Furthermore, when the cartridge C is inserted with its backward edge front, the locking notch C1 of the cartridge C fails to face the locking projection 32b, and the side of the cartridge C pushes the locking projection 32b, and the pull member 32 is pivoted in the direction of (i) in the state shown in FIG. 4. The first sliding shaft 32e formed on the underside of the pull member 32 is projected outward through the cutout 36 of the guide plate 35 out of the guide plate 35. If the push portion 33b is further pushed in the X2 direction by the cartridge C, the first sliding shaft 32e slides along the escape guide surface 35b of the guide plate 35.

When the incorrectly inserted cartridge C pushes the pull/ejection mechanism 30 in the X2 direction, the pull/ejection arm 16 is counterclockwise pivoted, and the push portion 16b parts from the insertion sensing arm 21 turning the first switch SW1 to "OFF" and starting the mode switching motor M2. With the motor M2 starting, the first switching lever 54 moves in the X1 direction, pivoting counterclockwise the arm differential member 18 and pull/ejection arm 16. In the pull/ejection mechanism 30, the first sliding shaft 32e integrally formed with the pull member 32 slides along the escape guide surface 35b of the guide plate 35 in the X2 direction, and the locking projection 32b passes by the side of the cartridge C in the X2 direction without pulling the cartridge C, and a subsequent operation is continuously performed. More particularly, the mode switching motor M2 continuously runs, and the device goes to the reproduction mode shown in FIG. 8 or to the recording mode shown in FIG. 9. Since the cartridge C is partly projected out of the cartridge holder 11, the cartridge holder 11 lowers in its inclined position with the cartridge C partly projected outward, rather than in its horizontal position as shown in FIG. 11, in the reproduction mode or recording mode. Since the holder support member 12 and cartridge holder 11 are mutually pivotally supported by means of the connector sections 13, 13, no mechanism locking takes place even if the cartridge holder 11 lowers in its inclined position.

Even when the cartridge C is inserted in the incorrect direction, the pull/ejection mechanism 30 is free from touching and then locking with the cartridge C, and the mode switching motor M2 is prevented from continuously running in such a lock state. With this arrangement, an increase in the load on the mode switching motor M2 and a damage arising from such a load increase are precluded, and any mechanism locking leading to any damage is thus precluded.

Since the cartridge C can be inserted only until it abuts the shutter release member 11c and is free from any mechanism locking thereon, the cartridge C is freely taken out of the device.

According to the present invention, as described above, a series of steps including the completion of the loading operation of the recording medium, the position control of the head in the reproduction mode, and the position control of the head in the recording mode are performed by the single motor. The mode switching means comprises two switching levers, one switching lever is permitted to reciprocate during the movement of the other switching lever, and a compact design is implemented in the mode switching means. The pulling stroke for the recording medium is lengthened.

What is claimed is:

1. A recording medium driving apparatus, comprising a holder into which a recording medium is inserted, a driving unit which performs recording and reproduction with the recording medium loaded therein, a head facing the recording medium, and mode switching means driven by a motor, wherein the mode switching means comprises:

a first switching lever which slides in a predetermined linear direction when a driving force is applied;

a second switching lever which slides with the first switching lever in the predetermined linear direction and then slides in a second linear direction opposite to that of said first switching lever;

said second switching lever comprising a head controller for moving the head in relation to the recording medium when the second switching lever slides in the second linear direction; and an inverting member which causes said second switching lever to be moved in the second linear direction.

2. A recording medium driving apparatus according to claim 1, wherein the recording medium is based on a magneto-optical recording system; the head is a magnetic head which faces one side of the recording medium with an optical head facing the other side of the recording medium, while moving integrally with the optical head; and the head controller comprises a reproduction setting section for moving the head to a position close to the recording medium in a reproduction mode and a recording mode setting section for setting a recording mode by moving the head to a position of contact with the recording medium when the second switching lever moves in the second linear direction.

3. A recording medium driving apparatus according to claim 2, wherein the driving apparatus has a standby mode; said standby mode defined by a position in which the head is spaced farther apart from the recording medium than in the reproduction mode;

said standby mode controlled by the movement of said first switching lever in the predetermined linear direction; and wherein the continued movement of said first switching lever in said predetermined linear direction transfers control of the position of the head to the head controller of the second switching lever.

4. A recording medium driving apparatus according to claim 2 further comprising the holder into which the recording medium is inserted, and a pull/ejection mechanism for pulling the recording medium into the holder and ejecting the recording medium out of the holder, wherein the movement of said first switching lever in the predetermined linear direction causes the pull/ejection mechanism to operate in the direction of pulling the recording medium, wherein the movement of said first switching lever in the second linear direction causes the pull/ejection mechanism to operate in the direction of ejecting the recording medium, wherein the movement of said first switching lever prompts the loading of the recording medium out of the holder into the driving unit;

wherein the head controller of the second switching lever keeps the head in a position spaced farther apart from the recording medium than in the reproduction mode at the moment the recording medium is loaded in the driving unit; and wherein the movement of said second switching lever in the second linear direction sets the reproduction mode and recording mode.

5. A recording medium driving apparatus according to claim 1 further comprising the holder into which the recording medium is inserted, and a pull/ejection mechanism for pulling the recording medium into the holder and ejecting the recording medium out of the holder, wherein the movement of said first switching lever in the predetermined linear direction causes the pull/ejection mechanism to operate in the direction of pulling the recording medium and wherein the movement of said first switching lever in the second linear direction causes the pull/ejection mechanism to operate in the direction of ejecting the recording medium.

6. A recording medium driving apparatus according to claim 1 further comprising a sensor member for sensing a start point and an end point of a movement of the second switching lever in said second linear direction;

wherein the start and end of the operation of the mode switching means is sensed by a sensing operation of the sensor member.

7. A recording medium driving apparatus according to claim 1, wherein a first stroke of the first switching lever in the predetermined linear direction is amplified by the inverting member against a simultaneous stroke of the second switching lever in the second linear direction such that the stroke of travel of the first switching lever is shortened.

8. A recording medium driving apparatus according to claim 1, wherein the movement of said switching levers in relation to each other drives the completion of a loading operation of said recording medium;

switches the position of the head to the standby mode;

switches the position of the head to the reproduction mode; and switches the position of the head to the recording mode.

* * * * *